(12) United States Patent
An

(10) Patent No.: US 9,448,855 B2
(45) Date of Patent: Sep. 20, 2016

(54) SYSTEM AND METHOD FOR EXECUTING A CLOUD COMPUTING TASK

(75) Inventor: Ki-Mo An, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 6 days.

(21) Appl. No.: 13/364,188

(22) Filed: Feb. 1, 2012

(65) Prior Publication Data

US 2012/0197960 A1 Aug. 2, 2012

(30) Foreign Application Priority Data

Feb. 1, 2011 (KR) .................. 10-2011-0010030

(51) Int. Cl.
G06F 15/16 (2006.01)
G06F 15/163 (2006.01)
G06F 9/50 (2006.01)
G06F 9/48 (2006.01)

(52) U.S. Cl.
CPC ........... *G06F 9/5094* (2013.01); *G06F 9/4843* (2013.01); *G06F 9/5072* (2013.01); *G06F 15/163* (2013.01); *Y02B 60/142* (2013.01)

(58) Field of Classification Search
CPC ....... H04L 12/14; H04B 1/3883; H04B 7/26; H04B 17/00; H04B 10/07955; H02J 7/0044; H02J 17/00; H04W 76/00; H04W 52/027; H04W 52/0258; H04M 1/7258; H04M 1/72561; H04M 1/72566; G06F 9/4843; G06F 9/5094; G06F 9/5072; G06F 15/163; Y02B 60/142
USPC ........................................................ 703/201
See application file for complete search history.

(56) References Cited

U.S. PATENT DOCUMENTS

| | | | | |
|---|---|---|---|---|
| 7,246,174 B2 * | 7/2007 | Sciandra et al. | | 709/244 |
| 7,715,790 B1 * | 5/2010 | Kennedy | | 455/41.2 |
| 7,792,865 B2 * | 9/2010 | Hamada et al. | | 707/796 |
| 8,155,711 B2 * | 4/2012 | Deshpande et al. | | 455/573 |
| 2002/0052957 A1 * | 5/2002 | Shimada | | 709/225 |
| 2002/0078059 A1 * | 6/2002 | Urera | | 707/100 |
| 2003/0101259 A1 * | 5/2003 | Lu | | 709/224 |
| 2005/0170827 A1 * | 8/2005 | Nagashima | | 455/419 |
| 2005/0177506 A1 * | 8/2005 | Rissanen | | 705/40 |
| 2008/0010372 A1 * | 1/2008 | Khedouri | | G06F 17/30094 709/224 |
| 2008/0155159 A1 * | 6/2008 | Rivas et al. | | 710/305 |
| 2009/0143114 A1 * | 6/2009 | Vargas et al. | | 455/574 |
| 2009/0298553 A1 * | 12/2009 | Ungari et al. | | 455/573 |
| 2010/0041444 A1 * | 2/2010 | Chang et al. | | 455/573 |
| 2010/0287071 A1 * | 11/2010 | Shah et al. | | 705/27 |
| 2011/0013569 A1 * | 1/2011 | Scherzer et al. | | 370/329 |
| 2011/0050164 A1 * | 3/2011 | Partovi | | H01F 5/003 320/108 |
| 2011/0252145 A1 * | 10/2011 | Lampell et al. | | 709/227 |
| 2011/0307599 A1 * | 12/2011 | Saretto | | G06F 9/5072 709/224 |
| 2012/0109826 A1 * | 5/2012 | Kobres | | 705/64 |
| 2012/0124162 A1 * | 5/2012 | Cassidy | | 709/217 |
| 2012/0185533 A1 * | 7/2012 | Vuong | | 709/204 |
| 2013/0091570 A1 * | 4/2013 | McCorkendale et al. | | 726/23 |
| 2013/0290985 A1 * | 10/2013 | Walsh | | 719/318 |
| 2014/0010135 A1 * | 1/2014 | Navda et al. | | 370/311 |
| 2014/0045481 A1 * | 2/2014 | Fraley | | 455/418 |

* cited by examiner

*Primary Examiner* — Hyun Park
*Assistant Examiner* — Eyob Hagos

(57) ABSTRACT

According to one embodiment system and method provides executing at least a portion of a cloud computing task on a client terminal. The system and method further includes checking whether the client terminal is recharging or not and accessing a server for executing the cloud computing task if the terminal is recharging.

14 Claims, 3 Drawing Sheets

SYSTEM AND METHOD FOR EXECUTING A CLOUD COMPUTING TASK

CROSS-REFERENCE TO RELATED APPLICATION AND CLAIM OF PRIORITY

The present application is related to and claims priority under 35 U.S.C. §119(a) to a Korean Patent Application filed in the Korean Intellectual Property Office on Feb. 1, 2011 and assigned Serial No. 10-2011-0010030, the contents of which are herein incorporated by reference.

TECHNICAL FIELD OF THE INVENTION

The present invention relates generally to computer networks, and more particularly, to a system and method for executing a cloud computing task.

BACKGROUND OF THE INVENTION

Portable terminals such as portable mobile terminals (e.g., cellular phones), electronic notebooks, personal multi-terminals, and the like have become popular due to the growth of telecommunication technology. These portable terminals have become an often used technique for rapidly exchanging information with others. Now, the Internet often provides various services to the portable terminals.

Cloud computing has become more popular in recent years. Cloud computing is based on a concept that all information of a user may be stored in a server on the Internet in a manner that it may be used when ever and where ever the user has access to the Internet. In other words, cloud computing generally refers to a computer service that uses computer resources such as software existing in an intangible form to integrate computer resources that are scattered at different physical locations using virtual technology. Cloud computing is performed using a relatively complex combination of utility computing, Software As a service (SAAS) and Grid computing concepts. Namely, from the viewpoint of a user, cloud computing may be similar to utility computing or SAAS in that fees are assessed in proportion to the use of hardware and/or software computing resources. From the viewpoint of the resource provider, cloud computing is generally similar to the concept of grid computing in that it can allow dispersed computing resources to be used with one another for being utilized as a single computing resource.

If such cloud computing is utilized, the performance of computers may be enhanced by sparing the limited resources of computer (for example; processing capacity of a CPU and a memory, a storage space of hard-disk and the like) due to the fact that computers connected on a network can share information in a synergistic manner. Many computers may have physical limits even though high efficient CPU are used. Additionally, computers functioning together may aid in solving such problem a plural of CPU can be connected in parallel for distributed processing. Namely, if many computing devices such as PCs, servers, PDAs, and the like are connected with a single network to function as a dispersed resource, the capacity of information processed may be improved considerably in some cases. If such a concept were to apply to the Internet, it may, in some cases, be possible to transfer data to a plural of unspecified devices on the Internet and collect data in a server after processing.

SUMMARY OF THE INVENTION

To address the above-discussed deficiencies of the prior art, it is a primary aspect of the present invention to solve at least the above-mentioned problems and/or disadvantages and to provide at least the advantages described below. Accordingly, an aspect of the present invention is to provide a system and method for selecting a client terminal to execute at least a portion of a cloud computing task based upon certain conditions.

Other aspects of the present invention is to provide a system and method in which one client terminal being recharged among multiple client terminals operated by a battery is made to participates in a cloud computing task.

Another aspect of the present invention is to provide a system and method in which client terminals not being charged may be made to participate in a cloud computing task.

Yet another aspect of the present invention is to provide a system and method in which an execution time period for executing a portion of a cloud computing task by a client terminal can be set up by its user.

In accordance with an exemplary embodiment of the present invention, a method for executing a cloud computing task with a client terminal is provided. The method includes checking whether the client terminal is recharging or not, and accessing a server and executing at least a portion of a cloud computing task if the client terminal is recharging.

In accordance with another exemplary embodiment of the present invention, a client terminal includes a controller configured to check whether the client terminal is recharging or not, and access a server and execute at least a portion of a cloud computing task if the client terminal is recharging.

In accordance with another exemplary embodiment of the present invention, a system includes a client terminal and a server. The client terminal is configured to check whether the client terminal is recharging or not, and access a server and execute at least a portion of a cloud computing task if the client terminal is recharging.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE INVENTION

Figure 1:
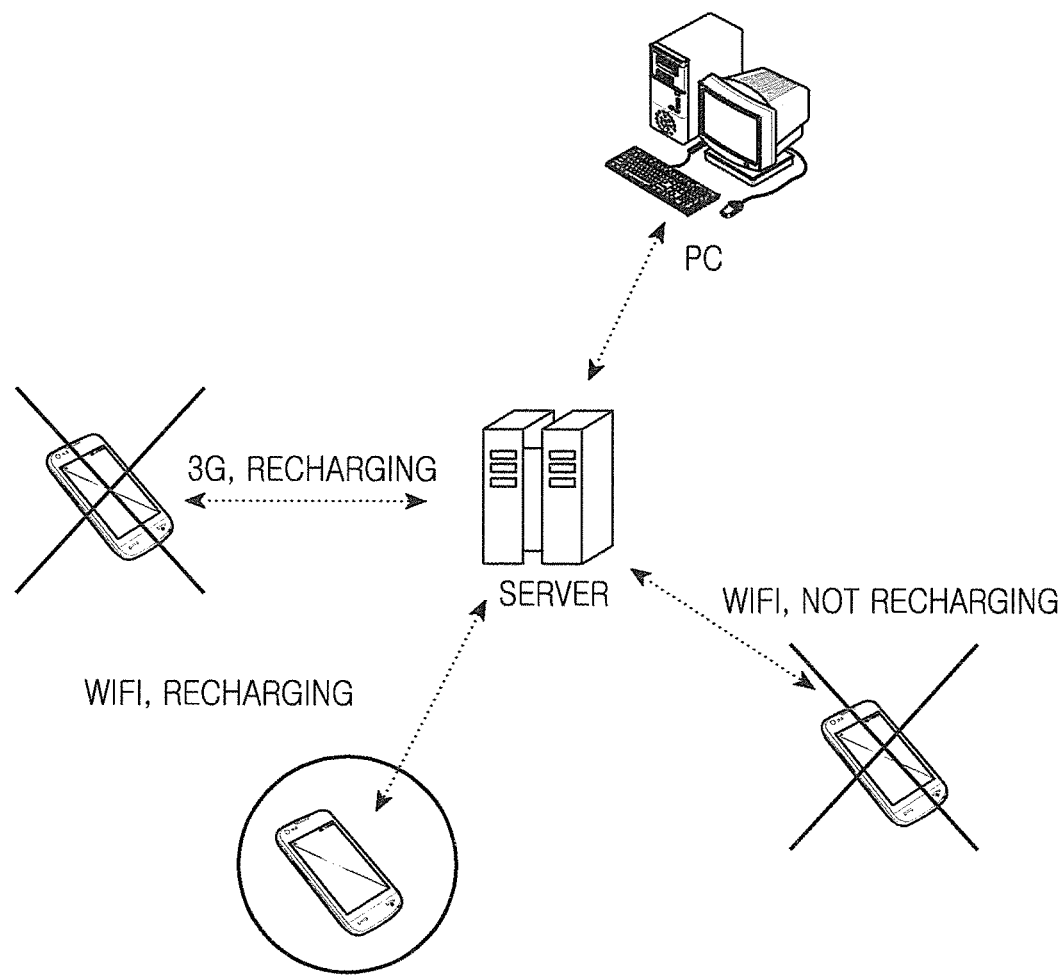
FIG. 1 illustrates an example cloud computing structure according to an embodiment of the present invention.
Figure 2:
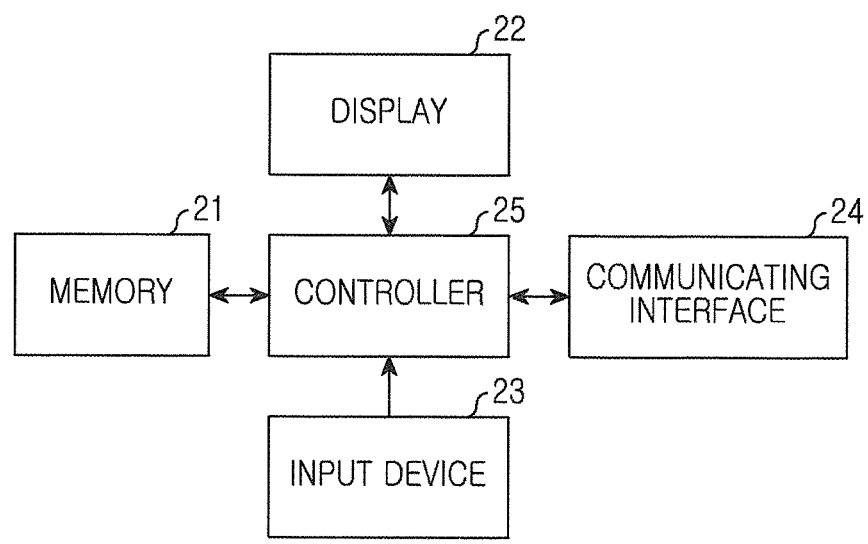
FIG. 2 illustrates an example structure of a client terminal according to an embodiment of the present invention.
Figure 3:
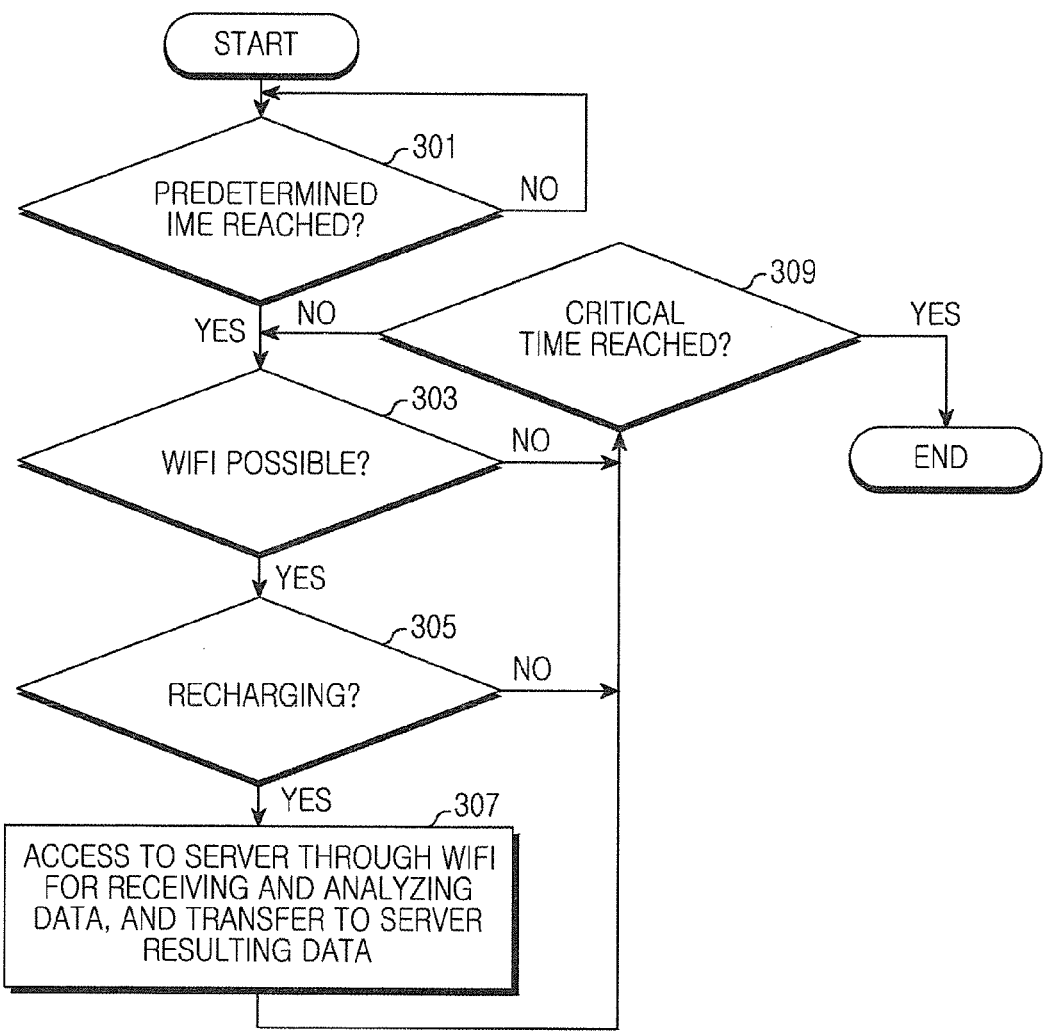
FIG. 3 illustrates an example process for executing a cloud computing task by a client terminal according to one embodiment of the present disclosure.

FIGS. 1 through 3, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged computing devices. Exemplary embodiments of the present invention will be described herein below with reference to the accompanying drawings. In the following description, well-known functions or constructions are not described in detail since they would obscure the invention in unnecessary detail. Also, the terms used herein are defined according to the functions of the present invention. Thus, the terms may vary depending on user's or operator's intention and usage. That is, the terms used herein must be understood based on the descriptions made herein.

One purpose of the present invention may be to provide a system and method in which a client terminal is made to participate in cloud computing when it is operated by a battery that is being recharged, or there is no additional communication fee assessed for the cloud computing service.

FIG. 1 illustrates an example cloud computing structure according to an embodiment of the present invention. For example, if cloud computing is utilized, an executable task relating to a corresponding project can be shared among multiple client terminals for processing by coupling various personal computers (PCs), mobile phones, and the like via a network. The PCs and mobile phones made to participate in cloud computing may become client terminals in communication with a corresponding server. In particular, a user can access a homepage built in the corresponding server and participate in a corresponding project voluntarily through cloud computing.

The user can designate a time for executing cloud computing with his client terminal. For instance, he can set up his terminal to execute cloud computing during his bedtime. Also, he can set up his terminal to execute a cloud computing task during a sleep mode of his terminal.

In one embodiment, the client user can set his terminal to not execute a cloud computing task if his client terminal is not recharging. Contrary to PCs, mobile phones often operate with a rechargeable battery. If a battery for operating a terminal is discharged or mostly discharged, cloud computing may be forcibly terminated such that a corresponding task executed on the computing cloud cannot be processed effectively.

In another embodiment, the user can set up his terminal to execute a cloud computing task when he can communicate without fee. For example, only when his mobile phone is within a WiFi (wireless fidelity) zone and he can communicate without fee, his terminal accesses the server that provides cloud computing. In some cases, the Internet can be used at no cost when certain mobile phones are located within WiFi hotspots. However, if cloud computing is executed at locations where free interne access is not allowed, it's use for cloud computing may burden the user with additional fee.

The server may distribute an executable interface program to members that helps to set up various parameters related to the operation of the cloud computing environment. The user may access the server with his terminal and agree to execute cloud computing for a corresponding project that is provided with the interface program. Then, the client user can set up other parameters for executing cloud computing environment under the conditions that the interface program may provide. For instance, the user can set up his client terminal to access the server for downloading data only one a.m. to five a.m. and to transfer the result to the server after the data is analyzed. Also, the user can set up his client terminal to not access the corresponding server if the client terminal is not recharging nor in a WiFi zone.

FIG. 2 illustrates an example structure of a client terminal according to an embodiment of the present invention.

Referring to FIG. 2, a client terminal according to the present invention comprises memory 21 to store the indicated object date, a display 22 to display information associated with stored data, an input device 23 for receiving input from a user, a communication interface 24 for communicating and a controller 25 to control the overall operation of the terminal. The input device 23 receives input from the user when the system receives conditions associated with execution of the cloud computing environment with his client terminal. The memory 21 stores the user interface program that sets up the conditions for executing cloud computing with the terminal according to an example of the present invention and the resulting information. The controller 25 executes cloud computing according to an embodiment of the present invention, as described in detail below.

FIG. 3 illustrates an example process for executing cloud computing with a client terminal according to the present invention.

Referring to FIG. 3, the controller 25 checks 303 whether it is possible to access to the Internet for free (e.g., WiFi) or not, if a predetermined time is reached 301. If it is possible to utilize the Internet for free, the controller 25 checks whether the terminal is recharging or not 305. If recharging, the controller 25 accesses a corresponding server through the Internet, receives data to analyze, and then transfer the result to the server 307. If it is possible neither to utilize the Internet for free nor the terminal being in a recharging state, the controller 25 executes step 303 and the following steps until a critical time is reached 309.

In certain embodiments, a user may access the server for executing a task with his client terminal according to an example of the present invention for the executing a cloud computing project when three conditions are met, namely during a predetermined time period, access to the Internet for free, and the terminal is recharging. In other embodiments, the present invention is not limited to the above mentioned conditions, such as when only one or two conditions among the three conditions is met.

And also, according to the example described above, the conditions are assessed according to conditions specified by the client terminal. In other embodiments, the server can request cloud computing to be performed on the client terminal at predetermined time periods in which the client terminal requested for cloud computing informs the server if it is possible to free access to the Internet, or if the client terminal is recharging. In this particular embodiment, the server judges the object of the cloud computing of the client terminal on the basis of information provided by the client terminal. For example, the time periods during which the server requests cloud computing be executed on the client terminal can be set up on the user interface that is provided in a homepage or website provided by the server.

In conclusion, according to the system and method of the present invention, a client terminal that executes cloud computing efficiently can be selected for executing a task of a cloud computing environment that may result in improved work efficiency in certain embodiments.

While the present invention has been particularly shown and described with reference to exemplary embodiments thereof, it will be understood by those skilled in the art that various changes in form and details may be made therein without departing from the spirit and scope of the present invention as defined by the appended claims.

What is claimed is:

1. A method implemented using a client terminal, the method comprising:
   determining, by the client terminal, whether a present time belongs to a predetermined time period;
   determining, by the client terminal, whether the client terminal is possible to utilize the Internet for free within a wireless-fidelity (Wi-Fi) zone when the present time belongs to the predetermined time period;
   determining, by the client terminal, whether the client terminal is in a recharging state when the client terminal is possible to utilize the Internet for free within the Wi-Fi zone;
   receiving, by the client terminal, data by accessing a server via the Internet for free to execute a cloud computing task when the client terminal is in the recharging state;
   analyzing, by the client terminal, the received data;
   transmitting, by the client terminal, a result of the analyzed data to the server;
   determining, by the client terminal, whether a threshold time is reached;
   terminating, by the client terminal, the cloud computing task when the threshold time is reached; and
   maintaining, by the client terminal, the cloud computing task when the threshold time is not reached,
   wherein the client terminal does not execute the cloud computing task when the client terminal is out of the Wi-Fi zone,
   wherein the cloud computing task is performed by the client terminal and shared with at least one other terminal by enabling the client terminal to connect with the at least one other terminal in parallel, and
   wherein the threshold time is associated with the execution time of the cloud computing task.

2. The method according to claim 1, wherein the predefined time period includes a time at which the client terminal is in a sleep mode.

3. The method according to claim 1, wherein the client terminal comprises a mobile phone.

4. The method according to claim 1, wherein the client terminal comprises a personal computer (PC).

5. The method according to claim 1, wherein the user-defined time includes a time at which the client terminal is not used by a user, a time when the client terminal is at one or more particular locations, and a reoccurring period of time.

6. A client terminal comprising:
   a controller configured to:
      determine whether a present time belongs to a predetermined time period when the present time belongs to the predetermined time period,
      determine whether the client terminal is possible to utilize the Internet for free within a wireless-fidelity (Wi-Fi) zone when the client terminal is possible to utilize the Internet for free within the Wi-Fi zone,
      determine whether the client terminal is in a recharging state when the client terminal is in the recharging state,
      receive data by accessing a server via the Internet for free to execute a cloud computing task,
      analyze the received data,
      transmit a result of the analyzed data to the server,
      determine whether a threshold time is reached when the threshold time is reached,
      terminate the cloud computing task, and
      when the threshold time is not reached, maintain the cloud computing task,
      wherein the client terminal is configured to not execute the cloud computing task when the client terminal is out of the Wi-Fi zone,
      wherein the cloud computing task is performed by the client terminal and shared with at least one other terminal by enabling the client terminal to connect with the at least one other terminal in parallel, and
      wherein the threshold time is associated with the execution time of the cloud computing task.

7. The client terminal according to claim 6, wherein the predefined time period includes a time at which the client terminal is in a sleep mode.

8. The client terminal according to claim 6, wherein the client terminal comprises a mobile phone.

9. The client terminal according to claim 6, wherein the client terminal comprises a personal computer (PC).

10. The client terminal according to claim 6, wherein the user-defined time includes a time at which the client terminal is not used by a user, a time when the client terminal is at one or more particular locations, and a reoccurring period of time.

11. A system comprising:
    a server; and
    a client terminal configured:
       determine whether a present time belongs to a predetermined time period when the present time belongs to the predetermined time period,
       determine whether the client terminal is possible to utilize the Internet for free within a wireless-fidelity (Wi-Fi) zone when the client terminal is possible to utilize the Internet for free within the Wi-Fi zone,
       determine whether the client terminal is in a recharging state when the client terminal is in the recharging state,
       receive data by accessing the server via the Internet for free to execute a cloud computing task,
       analyze the received data,
       transmit a result of the analyzed data to the server,
       determine whether a threshold time is reached when the threshold time is reached,
       terminate the cloud computing task, and
       when the threshold time is not reached, maintain the cloud computing task,
       wherein the client terminal is configured to not execute the cloud computing task when the client terminal is out of the Wi-Fi zone,
       wherein the cloud computing task is performed by the client terminal and shared with at least one other terminal by enabling the client terminal to connect with the at least one other terminal in parallel, and wherein the threshold time is associated with the execution time of the cloud computing task.

12. The system according to claim 11, wherein the predefined time period includes a time at which the client terminal is in a sleep mode.

13. The system according to claim 11, wherein the client terminal comprises at least one of a mobile phone and a personal computer (PC).

14. The system according to claim 11, wherein the user-defined time includes a time at which the client terminal is not used by a user, a time when the client terminal is at one or more particular locations, and a reoccurring period of time.

\* \* \* \* \*